United States Patent [19]
Tsuji

[11] Patent Number: 5,383,990
[45] Date of Patent: Jan. 24, 1995

[54] METHOD FOR BENDING AND LAMINATING A PAIR OF GLASS PLATES

[75] Inventor: Hiroshi Tsuji, Yokohama, Japan

[73] Assignee: Asahi Glass Company Ltd., Tokyo, Japan

[21] Appl. No.: 70,058

[22] Filed: Jun. 1, 1993

Related U.S. Application Data

[63] Continuation of Ser. No. 856,888, Mar. 25, 1992, abandoned, which is a continuation of Ser. No. 567,733, Aug. 15, 1990, abandoned.

[30] Foreign Application Priority Data

Aug. 24, 1989 [JP] Japan .................................. 1-216053

[51] Int. Cl.$^6$ .................... C03B 23/023; C03C 27/10
[52] U.S. Cl. .................... 156/102; 65/106; 65/107
[58] Field of Search .................. 65/24, 106, 107; 156/102, 287

[56] References Cited

U.S. PATENT DOCUMENTS

| | | | |
|---|---|---|---|
| 2,377,849 | 6/1945 | Binkert et al. | 65/107 |
| 2,470,461 | 5/1949 | Black | 65/24 |
| 2,827,739 | 3/1958 | Atkeson | 65/107 |
| 3,300,351 | 1/1967 | Richardson | 156/106 |
| 4,025,381 | 2/1978 | Furukawa et al. | 428/410 |
| 4,828,598 | 5/1989 | Imamura et al. | 65/106 |
| 4,842,664 | 6/1989 | Baudin | 156/102 |
| 4,909,820 | 3/1990 | Hirotsu et al. | 65/106 |
| 5,045,101 | 9/1991 | Hirotsu et al. | 65/106 |

*Primary Examiner*—Joye L. Woodard
*Attorney, Agent, or Firm*—Oblon, Spivak, McClelland, Maier & Neustadt

[57] ABSTRACT

In a curved laminated glass comprising a plurality of glass plates which are bent in a substantially convex form, laminated and bonded together, an outer glass plate is softened faster than an inner glass plate when they are located in an atmosphere of high temperature which is higher than a temperature capable of bending glass.

7 Claims, 1 Drawing Sheet

METHOD FOR BENDING AND LAMINATING A PAIR OF GLASS PLATES

This application is a continuation of application Ser. No. 07/856,888, filed on Mar. 25, 1992, now abandoned, which is a continuation of Ser. No. 07/567,733 filed, Aug. 15, 1990 now abandoned.

BACKGROUND OF THE INVENTION

1. Field of the Invention

The present invention relates to a laminated glass and a method of bending and shaping two overlapping glass plates simultaneously in a heating furnace to form a laminated glass.

2. Discussion of Background

A laminated glass is generally formed by laminating two glass plates and an intermediate plastic film such as polyvinyl butyral as an interlayer, and it is widely used for a windshield for an automobile from the viewpoint of safetyness.

In such laminated glass, a curved laminated glass is generally required for an automobile for requirements in designing. Accordingly, it is necessary that two flat glass plates are suitably bent to form a laminated glass. In this case, when the glass plates are separately bent, a delicate difference in shape appears between the curved glass plates to be laminated. Accordingly, when they are laminated with the intermediate film interposed therebetween, there causes disadvantages that a complete joint between the two overlapping glass plates interposing the intermediate film is not obtainable, and bubbles are resulted at the contacting surfaces during manufacturing steps or in use, or the overlapping glass plates and the intermediate film peel off. Accordingly, a method of bending simultaneously two overlapping glass plates has been employed for manufacturing a laminated glass.

As a conventional method of bending overlapping glass plates for a laminated glass, there has been utilized the method as follows. Two glass plates are put on a bending mold by interposing lubricating powder such as sodium hydrogen carbonate, cerite, magnesium oxide, silica or the like between the contacting surfaces; the bending mold on which the two overlapping glass plates are held is transferred in a heating furnace; the glass plates are heated to a processing temperature near a softening point (generally in a range of 580° C.–700° C. which varies depending on a kind of glass) to soften the overlapping glass plates, whereby they are bent by their deadweight along the shaping surface of the bending mold.

In the above-mentioned bending method, since a bending mold has a shaping surface with a concave form at its top, the radius of the upper glass plate after having been bent is smaller than that of the lower glass plate. Accordingly, it is necessary for the upper glass plate to be bent deeply or sharply. Therefore, it was difficult to bend sufficiently the upper glass plate in comparison with the lower glass plate, and particularly, two glass plates were not sufficiently fitted to each other at a portion where a deep-bending operation was to be applied. Accordingly, when these overlapping glass plates were laminated and bonded so as to form a laminated glass, a faulty product such as that having bubbles at the deeply bent portion might result.

In order to eliminate such insufficient bending to a side portion of a laminated glass to which a deeply bending operation is applied, it is sometimes necessary to press and shape the portion to be deeply bent by means of an auxiliary pressing member from the top of two overlapping glass plates in addition to shaping the side portion of the laminated glass by their own deadweight.

There has been proposed that a glass plate which is put on a bending mold at the upper side between two overlapping glass plates is formed to have a higher heat absorptivity than the lower glass plate so that the two overlapping glass plates are sufficiently fitted to each other at a portion where a deeply bending operation is needed (U.S. Pat. No. 3,300,351).

It is very important that the optical distortion in a windshield is substantially negligible when a curved laminated glass is used for the windshield for an automobile. Especially, where an optical distortion is a so-called lens-like distortion which has a lens-like appearance, it prohibits the eyesight of a driver, and therefore it is particularly undesirable.

SUMMARY OF THE INVENTION

The present invention is based on the finding that much lens-like distortion is resulted in the process of bending overlapping glass plates to form a laminated glass.

It is, therefore, an object of the present invention to provide a laminated glass in which lens-like distortion is minimized.

It is another object of the present invention to provide a method of bending glass plates to form the above-mentioned laminated glass.

According to the present invention, there is provided a curved laminated glass comprising a plurality of glass plates which are bent in a substantially convex form, laminated and bonded together characterized in that an outer glass plate is softened faster than an inner glass plate when they are located in an atmosphere of high temperature which is higher than a temperature capable of bending glass.

In accordance with the present invention, there is provided a method of bending glass plates for a laminated glass wherein two glass plates for a laminated glass are simultaneously bent, said method being characterized by a placing step of putting the two glass plates in an overlapping state on a bending mold having a shaping surface of a substantially concave form at its top under such a condition that the lower glass plate of said two glass plates is softened faster than the upper glass plate when they are put in an atmosphere of high temperature which is higher than a temperature capable of bending glass and a heating step of heating the glass plates to a temperature near the softening point of the glass plates in a heating furnace in order to bend them into a shape substantially corresponding to the shaping surface of the bending mold by utilizing the deadweight of the glass plates.

As a heating system for the heating furnace used to bend two overlapping glass plates, there is mainly employed a so-called a ceiling heating system wherein a heater or heaters are mainly arranged at or near the ceiling to uniformly heat the glass plates, and if necessary, a local heating means is provided to a portion where a sharply bending operation is necessary. In such arrangement of the heater or heaters, the upper glass plate of the overlapping glass plates tends to be overheated in comparison with the lower glass plate. Namely, in the conventional method of bending overlapping glass plates, the upper glass plate is more softened than the lower glass plate, and upper and lower glass plates deform in a close-contact state during the bending operation. Accordingly, a high pressure is applied to the surfaces between the upper and lower glass plates, whereby there often causes a local deformation or an indent because of lubricating powder interposing between the overlapping glass plates or a foreign matter invading therebetween. In a case that the overlapping glass plates having such defect are laminated and bonded, and thus formed laminated glass is used for a window glass for an automobile, a lens-like distortion may interfere the eyesight of a driver.

In a case that a pressing operation using the auxiliary pressing member is used in the bending operation in order to prevent the above-mentioned disadvantage that insufficient shaping of the glass plates is resulted at a portion to be deeply bent, a further higher pressure is applied to the overlapping glass plates, whereby a distortion because of lubricating powder or a foreign matter is particularly caused easily.

In the present invention, in a case that two overlapping glass plates are put on a bending mold having a shaping surface of a substantially concave form, a glass plate placed at the lower portion on the bending mold is softened faster than the upper glass plate when they are put in an atmosphere of high temperature which is higher than a glass bending temperature. Accordingly, when the glass plates are deformed by their own deadweight, the lower glass plate is first deformed, and the two glass plates deform under a condition that they are not completely in contact with each other. Therefore, no high pressure is applied to the surfaces between the glass plates. Accordingly, they hardly suffer influence by the lubricating powder or foreign matter interposing between the two glass plates to thereby suppress a local deformation, or a lens-like distortion of a laminated glass.

The method that a glass plate of two overlapping glass plates is softened faster than the other glass plate when they are put in an atmosphere of high temperature which is higher than the bend-processing temperature can be realized by various ways.

A typical example in methods of controlling the softening of glass plates is to increase the heat absorptivity, in particular, the heat absorptivity at a wavelength of 2–5 $\mu$m of one of the glass plates in comparison with the other glass plate. It is preferable that the glass plate is colored into blue, gray, bronze, green or the like by incorporating a metal such as iron, nickel, cobalt, selenium or the like because it is simple.

Another typical example to control the softening of glass plates is to lower the softening point of one of the glass plates (at the temperature when the viscosity of glass is $4.5 \times 10^7$ poise) in comparison with the other glass plate. The difference in softening point is preferably in a range of 5°–25° C., more preferably 10°–20° C. in consideration of a speed of shape-molding.

DESCRIPTION OF THE PREFERRED EMBODIMENTS

Figure 1A:
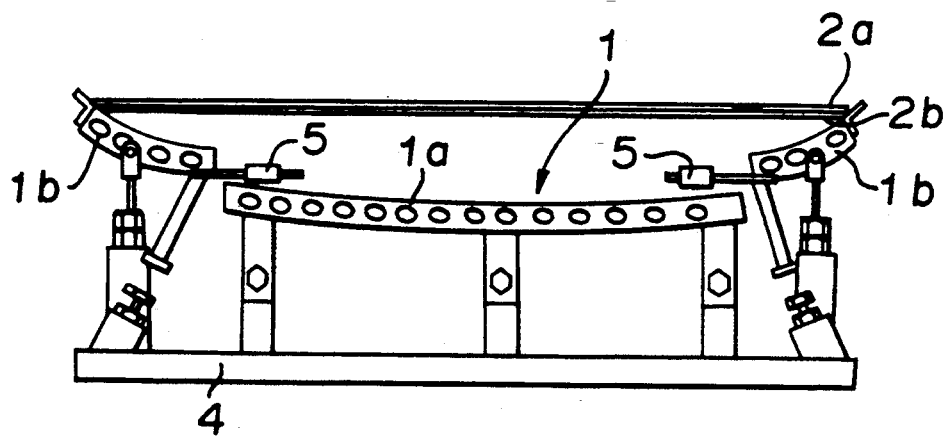
FIG. 1 is a front view schematically shown of an embodiment of a bending mold used for the present invention.

Referring now to the drawings, a preferred embodiment of the present invention will be described.

A split type deadweight bending mold 1 shown in FIG. 1 is placed on a base truck 4 as a transferring means. The bending mold 1 comprises a ring-like fixed splittable mold portion 1a having a bend-shaping surface which corresponds to an intermediate curved portion of overlapping glass plates which has been subjected to a bend-shaping operation and ring-like movable splittable mold portions 1b provided at both sides of the fixed splittable mold portion 1a so as to be movable, each of which has a bend-shaping surface corresponding to a portion to be deeply bent of the glass plates, and is movable to the set position where the bend-shaping surface of the movable splittable mold portion 1b comes in alignment with the bend-shaping surface of the fixed splittable mold portion 1a. The fixed splittable mold portion 1a is fixed to the base truck 4 by means of supporting bars, and both side portions in the width direction of each of the movable splittable mold portions 1b are respectively pivotted on the base truck 4 so as to be swingable. Further, a balance weight 5 is attached to each of the movable splittable mold portions 1b so as to be moved to a position in alignment with the fixed mold portion 1a.

Figure 1B:
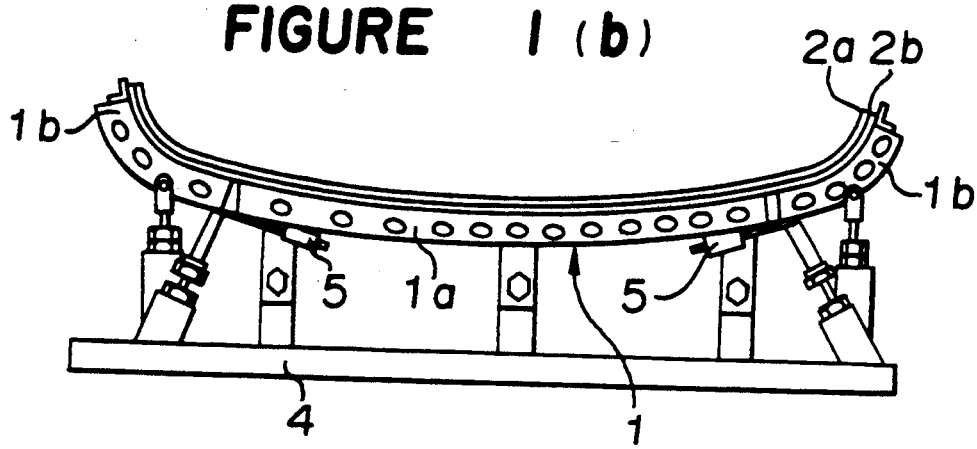

FIG. 1a shows the deadweight bending mold on which two flat glass plates are placed in an overlapping state before they are subjected to a heating operation, and FIG. 1b shows a state that the deadweight bending operation has finished for the overlapping glass plates.

On the bending mold 1 as shown in FIG. 1, a colorless transparent glass plate 2a having a thickness of 1.8 mm was put and a glass plate 2b which is a bluish transparent heat ray absorptive glass and having a thickness of 1.8 mm was put under the glass plate 2a interposing silica powder as a lubricating powder. Then, the bending mold 1 with the overlapping glass plates 2a, 2b are transferred into a heating furnace, and they are heated to a bend-processing temperature. The heating furnace was provided with heaters at its ceiling portion to heat the interior of the furnace and heaters at its side portions so that a uniform distribution of temperature was obtained in the furnace. The calorific ratio of the heaters at the ceiling portion and side portions was about 3:1.

Figure 2:
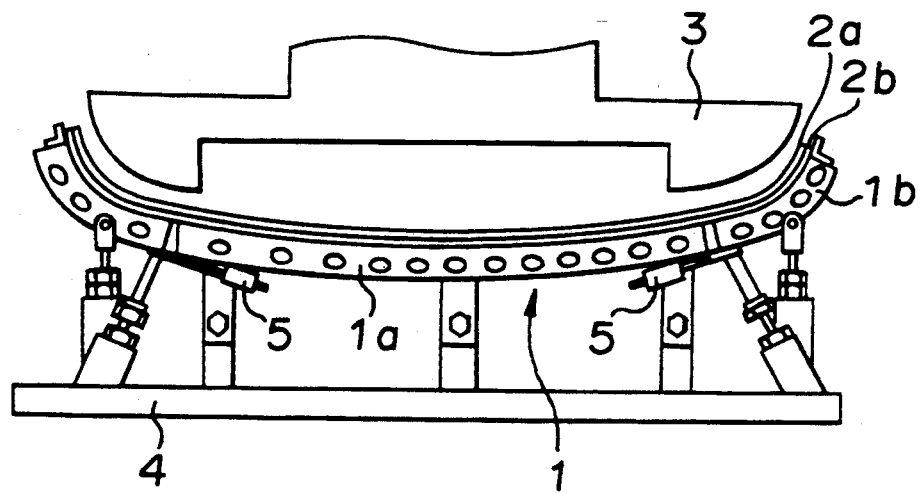
FIG. 2 is a front view of the bending mold as shown in FIG. 1 which shows behavior in a press-shaping operation.

After the glass plates have deformed by heating and have lowered by their deadweight so that the shape of the overlapping glass plates substantially comply with the shape of the shaping surface of the bending mold 1 by moving the movable splittable mold portion 1b of the bending mold 1 to the positions in alignment with the fixed splittable mold portion 1a. The portion to be deeply bent of the side portions of the glass plates is determined at a predetermined pressing position in order to press-shape the portion as shown in FIG. 2. Then, the portion to be deeply bent of the side portions of the glass plates is pressed from the top by means of an auxiliary pressing member 3 at the position so as to bend the glass plates in accordance with the shape of the shaping surface of the bending mold 1. Using of such pressing mold or the method of preparing a curved laminated glass of the present invention is preferable since a time required for the shape-molding can be shortened.

The auxiliary pressing member 3 is vertically movable by means of a cylinder for pressing (not shown) so that when the cylinder is lowered, the portion to be deeply bent of the overlapping glass plates 2a, 2b are press-shaped, and when the cylinder for pressing is raised, the pressing is released.

After the press-shaping operation has been finished, the overlapping glass plates are cooled and the bending operation is finished.

In the above-mentioned embodiment, it is a characteristic feature that the lower glass plate has higher heat absorptivity than the upper glass plate. For this purpose, it is preferable that the glass plate is colored to be gray, blue, bronze, green or the like by incorporating a metal such as iron, cobalt, nickel, selenium or the like because the coloring of the glass plate can be easy. For instance, in a preferred embodiment, the transmittance of energy to visible light is 87.6% for the upper colorless transparent glass plate and 77.3% for the lower bluish glass plate.

As the bending mold on which the two overlapping glass plates are placed, there can be used such a type of bending mold that the shaping surface which corresponds to the shape of a curved laminated glass plates is formed of a heat resisting material durable to a shaping temperature of a glass plate (580° C.-700° C.) in a heating furnace. Such bending mold may be of a splittable type comprising a movable splittable mold portion and a fixed splittable mold portion or of a fixed type having a single shaping surface.

In a case that the splittable type bending mold is to be used, it is preferable to prevent relative movement in position of the movable splittable mold portion and the fixed splittable mold portion due to a pressure in a press-shaping operation and by clamping the both mold portions so as not to cause jumping of the movable splittable mold portion. It is also possible to use a splittable type deadweight bending mold wherein overlapping glass plates are transferred to a fixed type bending mold before press-shaping. Further, an auxiliary heater may be used to obtain good processability by raising a heating temperature to a portion to be deeply bent of overlapping glass plates 10° C.-100° C. higher than the heating temperature to other portion, whereby the deeply bent portion is locally heated.

When the portion to be deeply bent of overlapping glass plates is pressed by an auxiliary pressing member, it is preferable to press them in the direction normal to the contacting portion between the auxiliary pressing member and the overlapping glass plates so as to reduce occurrence of wrinkles, flaws and traces by the pressing member. Further, in order to prevent occurrence of traces by the pressing member on the overlapping glass plates when the glass plates are press-shaped, it is desirable that a heat insulating cloths made of material such as glass fibers, silica fibers, ceramic fibers, metallic fibers or the like is used for the auxiliary pressing member so as to cover the contacting plane between the pressing member and the glass plate.

Further, in order to form a compressive strain layer at the circumferential portion of the overlapping glass plates or to strengthen that portion, an auxiliary heater may be used to heat the circumferential portion of the overlapping glass plates. Or overlapping glass plates may be forced upward and separated from a bending mold after the press-shaping operation to accelerate the cooling of the circumferential portion.

Upon the bending operation, the overlapping glass plates are formed into a laminated glass by a conventional method which is utilized to manufacture ordinary laminated glass. Namely, they are overlapped interposing an intermediate film such as polyvinyl butyral, provisionally bonded by heat or vacuum, and press-bonded by pressure and heat.

It is possible to investigate a state of strain in a laminated glass by applying light to the laminated glass so that the transmitted light is projected on a screen. A laminated glass prepared in accordance with the above-mentioned example, and a laminated glass prepared in the same manner as the above-mentioned example except that two colorless transparent glass plates were used, were examined to find a state of strain. It was confirmed that the number of lens-like distortion of the laminated glass prepared in accordance with the above-mentioned example was very few in comparison with the comparative example.

A second embodiment of the present invention will be described. The method in accordance with the second embodiment was carried out as follows. For the lower glass plate which had higher heat absorptivity than the upper glass plate as in the first embodiment, a glass plate 2a having a softening point of 731° C. and a thickness of 1.8 mm was put on the bending mold 1 as shown in FIG. 1, and a glass plate 2b having a softening point of 718° C. and a thickness of 1.8 mm was put on the bending mold 1 but under the glass plate 2a interposing silica powder as a lubricating powder therebetween. Since the other method is the same as the first embodiment, detailed description is omitted.

The characteristic feature of the second example is that the softening point of the lower glass plate is lower than the softening point of the upper glass plate. When the difference of softening point is too small, effect expected by the present invention can not be attained. On the contrary, when it is too large, there causes insufficient softening in the glass plates, whereby a poor shaping product is resulted or the softening is too much to thereby cause an optical distortion. Therefore, it is preferable that the difference in softening point is in a range of 5° C.-25° C. preferably 10° C.-20° C.

A laminated glass was prepared in the same manner as the second example except that two glass plates each having a softening point of 718° C. were used as comparative example. Optical distortion of the laminated glass of the second example and the comparative example were examined through the same method of projection of light as described above. It was confirmed that the degree of lens-like distortion of the second example was very little in comparison with that of the comparative example.

It should be understood that the first and second examples are mere examples among a number of methods to obtain a laminated glass wherein the outer glass plate is softened faster than the inner glass plate when they are put in an atmosphere of high temperature which is higher than a bend-processing temperature of glass. A method in combination of the first and second examples, i.e a curved laminated glass formed by laminating and bonding a plurality of glass plates which are bent in a substantially concave form wherein the outer glass plate has higher heat absorptivity than the inner glass plate, and the softening point of the former is lower than the later, is also included in the present invention.

The present invention includes a curved laminated glass in a substantially convex form. Generally, a laminated glass used for a windshield for an automobile is curved along the horizontal direction more than along the vertical direction. In this case, a laminated glass windshield curved along the horizontal direction in a convex form is included in the present invention.

In accordance with the present invention, a laminated glass of a high quality and minimizing a lens-like distortion which is used suitably for a windshield for an automobile and a method of preparing the same can be obtained.

Further, in the method of forming a curved laminated glass of the present invention, the bending operation for overlapping glass plates can be carried out for a short time by cooperatively using a press-shaping mold.

What is claimed is:

1. A method of bending glass plates for a laminated glass wherein two glass plates for a laminated glass are simultaneously bent, the method comprising:

providing first and second glass plates which are components of the laminated glass in an overlapping state on a bending mold, said bending mold having a shaping surface of a substantially concave form, wherein the second glass plate is disposed below said first glass plate and said second glass plate has at least one of: (a) a heat absorptivity which is greater than a heat absorptivity of said first glass plate; and (b) a softening point which is lower than a softening point of said first glass plate; such that said second glass plate is softened faster than said first glass plate when said first and second glass plates are heated;

heating said first and second glass plates in a heating furnace such that said first and second glass plates are bent into a shape substantially corresponding to the shaping surface of the bending mold utilizing the deadweight of the first and second glass plates; and combining said first and second plates to form a laminated glass.

2. The method of bending glass plates for a laminated glass according to claim 1, wherein after the heating step, portions to be deeply bent of the first and second glass plates are pressed from the top.

3. The method of claim 1, wherein the step of providing said first and second glass plates includes providing only said first and second glass plates in said bending mold, such that no glass plates are present in said bending mold except for said first and second glass plates.

4. The method of claim 1, wherein the step of providing said first and second glass plates includes providing as said second glass plate a glass plate having a softening point which is 5°–25° C. lower than a softening point of said first glass plate.

5. The method of claim 4, wherein said softening point of said second glass plate is 10°–20° C. lower than the softening point of said first glass plate.

6. The method of claim 1, wherein said second glass plate is colored such that said second glass plate has a higher heat absorptivity than said first glass plate.

7. The method of claim 1, wherein said second glass plate has a lower softening point than said first glass plate, and further wherein said second glass plate has a higher absorptivity than said first glass plate.

* * * * *